(12) United States Patent
Ide et al.

(10) Patent No.: US 9,689,348 B2
(45) Date of Patent: Jun. 27, 2017

(54) CONTROL APPARATUS AND CONTROL METHOD FOR INTERNAL COMBUSTION ENGINE

(75) Inventors: Kazunari Ide, Tokyo (JP); Takaharu Hiroe, Tokyo (JP); Hiroyoshi Kubo, Tokyo (JP); Tomohide Yamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 514 days.

(21) Appl. No.: 14/116,032

(22) PCT Filed: Jan. 27, 2012

(86) PCT No.: PCT/JP2012/051893
§ 371 (c)(1),
(2), (4) Date: Nov. 27, 2013

(87) PCT Pub. No.: WO2013/001844
PCT Pub. Date: Jan. 3, 2013

(65) Prior Publication Data
US 2014/0123966 A1 May 8, 2014

(30) Foreign Application Priority Data
Jun. 28, 2011 (JP) .................................. 2011-142512

(51) Int. Cl.
*F02M 25/07* (2006.01)
*F02D 21/08* (2006.01)
(Continued)

(52) U.S. Cl.
CPC ....... *F02M 25/0704* (2013.01); *F02B 37/025* (2013.01); *F02B 37/22* (2013.01);
(Continued)

(58) Field of Classification Search
CPC ........... F02M 25/0704; F02M 25/0707; F02M 25/0713; F02M 25/0727; F02B 37/025;
(Continued)

(56) References Cited

U.S. PATENT DOCUMENTS 5,448,147 A * 9/1995 Kasai .................. G05B 13/041
318/568.17
6,076,353 A * 6/2000 Freudenberg ........... F02B 37/24
60/605.2
(Continued)

FOREIGN PATENT DOCUMENTS

CN 1644900 A 7/2005
CN 101160550 A 4/2008
(Continued)

OTHER PUBLICATIONS

Chinese Office Action and Search Report, issued Jun. 3, 2015, for Chinese Application No. 201280022460.3, along with English translations.
(Continued)

*Primary Examiner* — Thomas Moulis
*Assistant Examiner* — Susan Scharpf
(74) *Attorney, Agent, or Firm* — Birch, Stewart, Kolasch & Birch, LLP

(57) ABSTRACT

A control apparatus 57 is a 2-input, 2-output integral-type optimal servo system in which intake air amount and intake oxygen concentration are used as control quantities (y1, y2) and the degree of opening of a control valve of an exhaust gas recirculation apparatus and the degree of opening of a control valve of a supercharger equipped with a variable flow rate mechanism are used as manipulated quantities (u1, u2), and includes an output feedback system. The control apparatus (57) is provided with an EGR valve opening degree unit (70) and an opening rate valve of the super-
(Continued)

charger. Each of the control units includes a non-interference controller (64) for eliminating interference between the manipulated quantity for the control valve of the exhaust gas recirculation apparatus and the manipulated quantity for the control valve of the supercharger equipped with the variable flow rate mechanism.

10 Claims, 9 Drawing Sheets

(51) Int. Cl.
| | | |
|---|---|---|
| F02D 23/00 | (2006.01) | |
| F02B 37/02 | (2006.01) | |
| F02B 37/22 | (2006.01) | |
| F02D 41/00 | (2006.01) | |
| F02D 41/14 | (2006.01) | |
| F02M 26/05 | (2016.01) | |
| F02M 26/10 | (2016.01) | |
| F02B 29/04 | (2006.01) | |
| F02M 26/23 | (2016.01) | |

(52) U.S. Cl.
CPC ............ *F02D 21/08* (2013.01); *F02D 23/00* (2013.01); *F02D 41/005* (2013.01); *F02D 41/0007* (2013.01); *F02D 41/0077* (2013.01); *F02D 41/1401* (2013.01); *F02M 26/05* (2016.02); *F02M 26/10* (2016.02); *F02B 29/0406* (2013.01); *F02D 41/1482* (2013.01); *F02D 2041/1419* (2013.01); *F02M 26/23* (2016.02); *Y02T 10/144* (2013.01); *Y02T 10/47* (2013.01)

(58) Field of Classification Search
CPC ...... F02B 37/22; F02B 29/0406; F02D 21/08; F02D 23/00; F02D 41/0007; F02D 41/005; F02D 41/0077; F02D 41/1401; F02D 2041/1419; F02D 41/1482; F02D 41/0052; Y02T 10/121; Y02T 10/144
USPC .......... 123/568.21, 568.12; 701/108; 60/272, 60/280
See application file for complete search history.

(56) References Cited

U.S. PATENT DOCUMENTS

| | | | | |
|---|---|---|---|---|
| 6,209,530 B1* | 4/2001 | Faletti | ..................... | F02B 33/42 123/559.2 |
| 6,360,541 B2* | 3/2002 | Waszkiewicz | ........ | F02D 41/005 123/568.12 |
| 6,725,847 B2* | 4/2004 | Brunemann | .......... | F02D 41/005 123/568.12 |
| 7,110,876 B2* | 9/2006 | Uchiyama | ........... | F02D 41/0007 123/568.12 |
| 7,117,078 B1* | 10/2006 | Gangopadhyay | ... | F02D 41/1454 123/672 |
| 7,137,246 B2* | 11/2006 | van Nieuwstadt | .... | F01N 3/0253 60/274 |
| 2004/0098145 A1* | 5/2004 | Zhenduo | ................ | G05B 11/42 700/42 |
| 2005/0155348 A1* | 7/2005 | Inoue | .................. | F02D 41/0007 60/602 |
| 2005/0228573 A1* | 10/2005 | Gangopadhyay | ... | F02D 41/0052 701/108 |
| 2006/0213490 A1* | 9/2006 | Vigild | ................. | F02D 41/0052 123/704 |
| 2009/0018676 A1* | 1/2009 | Nanno | ................... | G05B 17/02 700/23 |
| 2009/0112447 A1* | 4/2009 | Ishizuka | ................. | F02D 33/02 701/109 |
| 2010/0024787 A1* | 2/2010 | Chi | ..................... | F02D 41/0072 123/568.11 |
| 2011/0029220 A1* | 2/2011 | Sasaki | ..................... | F02B 37/24 701/106 |
| 2014/0069396 A1* | 3/2014 | Iemura | .................... | F02B 37/24 123/559.1 |

FOREIGN PATENT DOCUMENTS

| | | |
|---|---|---|
| CN | 101418744 A | 4/2009 |
| EP | 1 077 319 A2 | 2/2001 |
| EP | 1 571 321 A2 | 9/2005 |
| EP | 1 852 757 A1 | 11/2007 |
| EP | 1 965 058 A2 | 9/2008 |
| JP | 2001-55946 A | 2/2001 |
| JP | 2003-21000 A | 1/2003 |
| JP | 2004-92471 A | 3/2004 |
| JP | 2004-164648 A | 6/2004 |
| JP | 2009-24550 A | 2/2009 |
| JP | 2009-197670 A | 9/2009 |
| JP | 2009-282878 A | 12/2009 |
| JP | 2010-249057 A | 11/2010 |
| JP | 2012-82720 A | 4/2012 |
| KP | 10-2004-0042874 A | 5/2004 |
| WO | 2006/088072 A1 | 8/2006 |

OTHER PUBLICATIONS

International Preliminary Report on Patentability for International Application No. PCT/JP2012/051893 mailed Jan. 16, 2014 with an English translation.
Chinese Notice of Allowance dated Jan. 20, 2016, for Chinese Application No. 201280022460.3 with the English translation.
Decision to Grant a Patent effective Feb. 10, 2015 issued in the corresponding Application No. 2011-142512 with an English translation.
Extended European Search Report effective Dec. 2, 2015 issued in the corresponding European Application No. 12805014.3.

* cited by examiner

US 9,689,348 B2

CONTROL APPARATUS AND CONTROL METHOD FOR INTERNAL COMBUSTION ENGINE

TECHNICAL FIELD

The present invention relates to a control apparatus and a control method of an internal combustion engine and in particular to a control apparatus and a control method of an internal combustion engine equipped with a supercharger having a variable flow rate mechanism and an exhaust gas recirculation apparatus.

BACKGROUND ART

In an internal combustion engine equipped with a control apparatus for a supercharger equipped with a variable flow rate mechanism being capable of controlling an intake air amount and an intake air pressure to a combustion chamber and a control apparatus for an exhaust gas recirculation apparatus (EGR) for recirculating a part of the exhaust gas to an intake-air passage or a cylinder, such as a diesel engine, in order to compensate for deficiency of the flow rate of the air entering the cylinder when the EGR is operating, by throttling a guide vane of the variable flow rate mechanism forming the supercharger (e.g. VFT) equipped with the variable flow rate mechanism, the exhaust gas pressure increases and in response to this, a recirculation amount of the exhaust gas recirculated by EGR increases. This makes it difficult to secure the amount of the air introduced into the combustion chamber or the intake oxygen concentration, thereby increasing black smoke occurrence. Alternatively, by opening the guide vane of the variable flow rate mechanism, the exhaust gas pressure declines, and this makes it difficult to secure the recirculation amount of EGR gas and to obtain NOx reduction effect, etc. As described above, the control for the EGR and the control for the supercharger equipped with the variable flow rate mechanism have a relationship of mutual interference that affects each other.

Particularly, when a load torque is increase, i.e. in transition, the guide vane of the variable flow rate mechanism of the VFT is moved toward a closed state to secure the air flow rate. As a result, the exhaust gas pressure increases, the recirculation amount of the EGR gas becomes more than necessary, the air amount and the intake oxygen concentration declines, and occurrence of black smoke becomes evident.

As a cooperative control between the control for the EGR and the control for the supercharger equipped with the variable flow rate mechanism, the technique disclosed in JP2003-21000A (Patent Document 1) is known. In JP2003-21000A, a target air amount and a target supercharging pressure are individually set, and when calculating EGR valve deviation amount, not just a difference between a detection value of an intake amount sensor and a target air amount but a difference between a detection value of an intake pressure sensor and a target air pressure are taken into account. Further, when calculating a deviation amount of the variable geometry mechanism (VGT) of the supercharger, not just a difference between the detection value of the intake pressure sensor and the target supercharging pressure but a difference between the detection value of the intake air amount sensor and the target air amount are taken into account so as to control the EGR valve and the VGT in a cooperative manner.

Further, disclosed in JP2010-249057A (Patent Document 2) is to control the internal combustion engine by means of a 2-input, 2-output integral-type optimal servo system by inputting detection values of the air flow amount and the intake air pressure and controlling opening of the EGR valve and opening of the guide vane of the variable nozzle turbine, and also to change a state feedback gain $K_F(h)$ and an integrating gain $K_I(h)$ of the integral-type optimal servo system according to operation conditions h of the internal combustion engine.

CITATION LIST

Patent Literature

[Patent Document 1]
  JP 2003-21000 A
[Patent Document 2]
  JP 2010-249057 A

SUMMARY

Technical Problem

The technique of Patent Document 1 relates to the cooperative control for controlling the EGR valve and VGT valve by taking into account the difference between the detection value of the intake pressure sensor and the target air pressure as well as the difference between the detection value of the intake pressure sensor and the target air pressure. However, a correction coefficient for the mutual control is set by a constant which is set in a map. More specifically, it is a feedback control using the correction coefficient in a partial operation state and thus, desired characteristics may not be obtained, and without correspondence to dynamic characteristics not being sufficiently considered, it is difficult to obtain effects in the transient operation state Disclosed in Patent Document 2 is to control opening of the EGR valve and opening of the guide vane of the variable nozzle turbine by means of the 2-input, 2-output integral-type optimal servo system and also to change feedback gain $K_F(h)$ and integrating gain $K_I(h)$ of the integral-type optimal servo system to correspond to the operation conditions h of the internal combustion engine.

There is, however, no disclosure regarding particular procedure of setting the state feedback gain $K_F(h)$ and integrating gain $K_I(h)$ so as to avoid control interference between the opening of the EGR valve and the opening of the vane of the variable nozzle turbine.

Further, the control input signals described in Patent Document 1 and Patent Document 2 include the air flow rate and the intake air pressure. However, in light of NOx and smoke exhaust amount reduction effect in the diesel engine, the factor which affects the exhaust amount of NOx is the intake oxygen concentration and the factor which affects the smoke exhaust amount is the air flow rate. Thus, the control based on the air flow rate and the intake air pressure is not appropriate for the control of reducing the NOx and smoke exhaust amount.

In view of the above issues, it is an object of the present invention, in an internal combustion engine equipped with a supercharger having an EGR and a variable flow rate mechanism, to provide a control apparatus and a control method, in which a 2-input, 2-output integral-type optimal servo system forms a control apparatus for controlling the supercharger having the EGR and the variable flow rate mechanism and which makes it possible to obtain efficient and stable reduction effect of reducing NOx and smoke exhaust amount by avoiding interference between the control for the EGR and the control for the supercharger having the variable flow rate mechanism.

Solution to Problem

To achieve the above object, the present invention provides a control apparatus for an internal combustion engine which comprises an exhaust gas recirculation device and a supercharger equipped with a variable flow rate mechanism. The control apparatus is configured to be a 2-input, 2-output integral-type optimal servo system which uses an intake air amount and an intake oxygen concentration as a controlled variable and an opening of a control valve of the exhaust gas recirculation device and an opening of a control valve of the supercharger with the variable flow rate mechanism as a manipulated variable, the control apparatus including an output feedback system for feedback of the controlled variable from the internal combustion engine. Further, the control apparatus comprises: an EGR valve opening controller for controlling the opening of the control valve of the exhaust gas recirculation device; and a variable flow valve opening controller for controlling the opening of the control valve of the supercharger with the variable flow rate mechanism. Each of the EGR valve opening controller and the variable flow valve opening controller comprises a non-interference controller for non-interference between the controlled variable controlled by the manipulated variable of the control valve of the exhaust gas recirculation device and the controlled variable controlled by the manipulated variable of the control valve of the supercharger with the variable flow rate mechanism with respect to each other.

According the above control apparatus, the control apparatus is configured to be a 2-input, 2-output integral-type optimal servo system which uses the intake air amount and the intake oxygen concentration as the controlled variable and the opening of a control valve of the exhaust gas recirculation device and the opening of a control valve of the supercharger with the variable flow rate mechanism as the manipulated variable and the control apparatus includes an output feedback system for feedback of the controlled variable from the internal combustion engine. Therefore, compared to two independent control apparatuses for independently controlling the control valve of the exhaust gas recirculation device and the control valve of the supercharger with the variable flow rate mechanism, it is possible to perform cooperative control.

Further, the control apparatus comprises: the EGR valve opening controller for controlling the opening of the control valve of the exhaust gas recirculation device; and the variable flow valve opening controller for controlling the opening of the control valve of the supercharger with the variable flow rate mechanism, and each of the controllers comprises a non-interference controller for non-interference between the controlled variable controlled by the manipulated variable of the control valve of the exhaust gas recirculation device and the controlled variable controlled by the manipulated variable of the control valve of the supercharger with the variable flow rate mechanism with respect to each other. Therefore, the non-interference controller makes it possible to control the manipulated variable of the control valve of the exhaust gas recirculation device and the manipulated variable of the control valve of the supercharger with the variable flow rate mechanism so that they do not interfere with each other. As a result, it is possible to reduce emissions of smoke and NOx efficiently and stably.

Further, it is preferable in the control apparatus of the present invention that the output feedback system of the controlled variable from the internal combustion engine includes a first output feedback signal returning to an input side of each of the controllers and a second output feedback signal returning to an output side of said each of the controllers, and a non-interference gain of the non-interference controller is set based on an output feedback gain of the second output feedback signal.

As described above, the non-interference gain of the non-interference controller which is provided in each of the EGR valve opening controller and the VFT valve opening controller is set based on an output feedback gain of the second output feedback signal which is returned to the output side of each of the controllers. More specifically, by setting the non-interference gain of the non-interference controller based on the relationship with the output feedback gain, it is possible to configure the non-interference controller simply.

It is also preferable in the control apparatus of the present invention that each of the EGR valve opening controller and the variable flow valve opening controller comprises: a difference calculator for calculating a difference between a target value of the controlled variable and the first output feedback signal in said each of the EGR valve opening controller and the variable flow valve opening controller; an integrator for integrating the difference calculated by the difference calculator; and the non-interference controller to which an integrated value calculated by the integrator is input.

As described above, the non-interference gain is applied to the signal integrated by the integrator and thus, it is possible to efficiently perform the non interference.

It is preferable in the control apparatus of the present invention that each of the EGR valve opening controller and the variable flow valve opening controller comprises: a difference calculator for calculating a difference between a target value of the controlled variable and the first output feedback signal in said each of the EGR valve opening controller and the variable flow valve opening controller; the non-interference controller to which a difference value calculated by the difference calculator is input; and an integrator for integrating an output value from the non-interference controller.

As described above, by arranging the integrator downstream from the non-interference controller, even when change in the engine rotation speed or the fuel injection amount in the steady operation causes fluctuation of the non-interference gain, the output from the non-interference controller is integrated by the integrator and output as the manipulated variable and thus, the non interference is performed in a stable manner.

Further, it is preferable in the control apparatus of the present invention that each of the EGR valve opening controller and the variable flow valve opening controller comprises: a limiter for limiting the manipulated variable within a certain range; and an anti-windup part.

After the manipulated variable is limited by the limiter and if the target value of the controlled variable changes, windup (saturation of the integrator) occurs in the case where the anti-windup part is not provided, and this lowers the controlled variable responsiveness. In the present embodiment, however, the anti-windup part is provided to prevent occurrence of windup and improve the controlled variable responsiveness. As a result, it is possible to improve reduction in NOx emission and black smoke emission in a transient state.

Furthermore, it is preferable in the control apparatus of the present invention that the non-interference gain of the non-interference controller is set as map data which corresponds to a rotation speed and a fuel injection amount of the internal combustion engine. By storing the non-interference gain as the map data corresponding to the operating state of the internal combustion engine, it is possible to simplify the control apparatus.

Moreover, according to the present invention, a control method for an internal combustion engine which comprises an exhaust gas recirculation device and a supercharger equipped with a variable flow rate mechanism, comprises the steps of:

controlling by a 2-input, 2-output integral-type optimal servo system which uses an intake air amount and an intake oxygen concentration as a controlled variable and an opening of a control valve of the exhaust gas recirculation device and an opening of a control valve of the supercharger with the variable flow rate mechanism as a manipulated variable, and controlling by an output feedback system for feedback of the controlled variable from the internal combustion engine;

calculating a non-interference gain of a non-interference controller based on an output feedback gain of an output feedback signal, the non-interference controlling being configured not to interfere with the controlled variable controlled by the manipulated variable of the control valve of the exhaust gas recirculation device and the controlled variable controlled by the manipulated variable of the control valve of the supercharger with the variable flow rate mechanism with respect to each other; and calculating the manipulated variable of the control valve of the exhaust gas recirculation device and the manipulated variable of the control valve of the supercharger with the variable flow rate mechanism based on an output value being set to the calculated non-interference gain.

According to this control method of the present invention, by controlling by a 2-input, 2-output integral-type optimal servo system which uses an intake air amount and an intake oxygen concentration as a controlled variable and an opening of a control valve of the exhaust gas recirculation device and an opening of a control valve of the supercharger with the variable flow rate mechanism as a manipulated variable, and controlling by an output feedback system for feedback of the controlled variable from the internal combustion engine, it is possible to perform cooperative control with each other, compared to two independent control apparatuses for independently controlling the control valve of the exhaust gas recirculation device and the control valve of the supercharger with the variable flow rate mechanism.

Further, by calculating a non-interference gain of a non-interference controller based on an output feedback gain of an output feedback signal, the non-interference controlling being configured not to interfere with the controlled variable controlled by the manipulated variable of the control valve of the exhaust gas recirculation device and the controlled variable controlled by the manipulated variable of the control valve of the supercharger with the variable flow rate mechanism with respect to each other; and calculating the manipulated variable of the control valve of the exhaust gas recirculation device and the manipulated variable of the control valve of the supercharger with the variable flow rate mechanism based on an output value being set to the calculated non-interference gain, it is possible to control in such a manner that the controlled variable controlled by the manipulated variable of the control valve of the exhaust gas recirculation device and the controlled variable controlled by the manipulated variable of the control valve of the supercharger with the variable flow rate mechanism do not interfere with each other.

Advantageous Effects

According to the control apparatus and control method of the present invention, in the internal combustion engine provided with EGR and the variable flow mechanism with supercharger, by controlling the turbocharger provided with the EGR and the variable flow rate mechanism by means of a 2-input, 2-output integral-type optimal servo system and avoiding mutual interference of the control of the EGR and the control of the turbocharger with variable flow rate mechanism with each other, it is possible to reduce emissions of smoke and NOx efficiently and stably.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)
<Overall Configuration>

Figure 1:
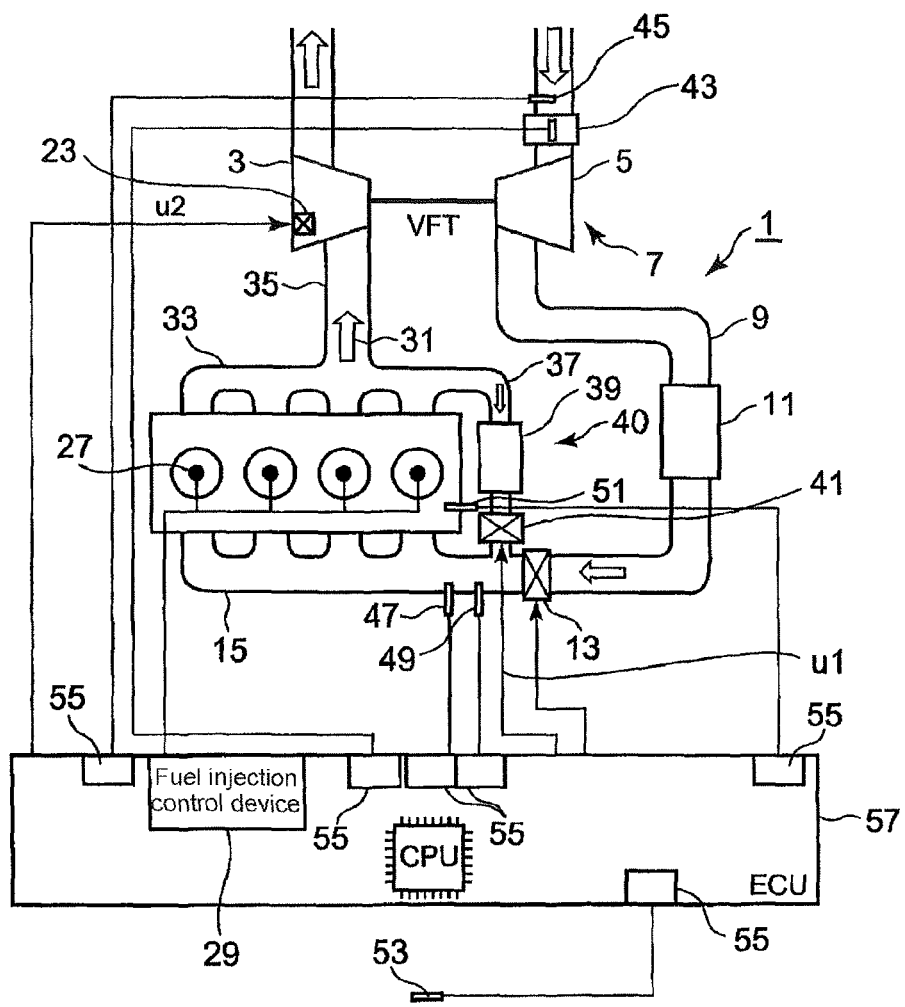
FIG. 1 is a general schematic view of a diesel engine to which a control apparatus of an internal combustion engine according to a first embodiment of the present invention is applied.

In reference to FIG. 1, described is an overall configuration of a diesel engine to which a control apparatus of an internal combustion engine according to the present invention is applied.

A diesel engine (engine) 1 is provided with an exhaust turbocharger 7 having an exhaust turbine 3 and a compressor 5 which is coaxially driven to the exhaust turbine 3. The diesel engine 1 is configured so that air discharged from the compressor 5 of the exhaust turbocharger 7 passes through an intake air passage 9, enters an intercooler 11 to be cooled. The intake flow rate of the cooled intake air is controlled by an intake throttle valve 13, and then is made to flow into a combustion chamber (not shown) of the engine 1 from the intake manifold 15.

Figure 2:
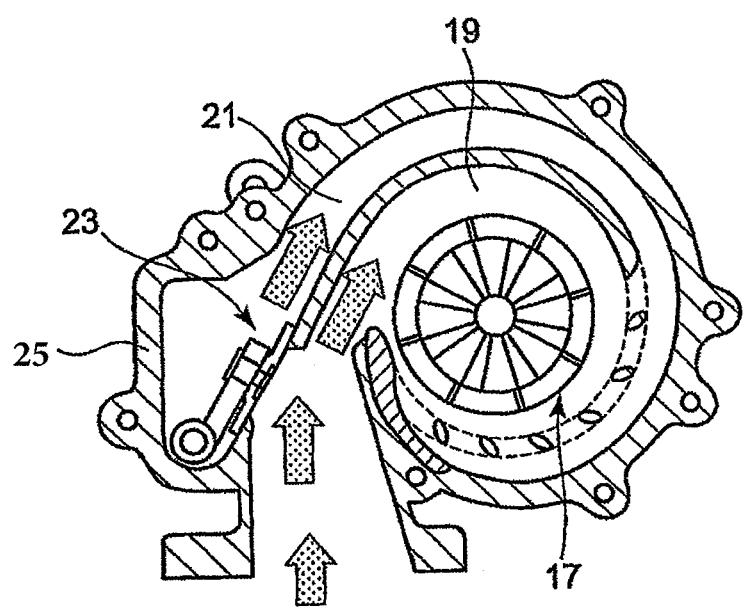
FIG. 2 is a cross-sectional view of a main section of a supercharger equipped with a variable flow rate mechanism.

This exhaust turbocharger 7 is a supercharger with a variable flow rate mechanism (VFT). This exhaust turbocharger 7 includes, as illustrated in FIG. 2, an outer scroll 21 and an inner scroll 19 extending to surround the entire circumference of the turbine rotor 17 continuously in the circumferential direction. The exhaust turbocharger 7 is provided with a VFT control valve 23 configured to switch between a state where the exhaust gas flows into the inner scroll 19 alone and a state where the exhaust gas flows into both the inner scroll 19 and the outer scroll 21.

The VFT control valve 23 is provided at one place of an end of the housing 25. By operating this VFT control valve 23, it is possible to switch the state between the state for allowing the exhaust gas to flow only to the inner scroll 19 and the state for allowing the exhaust gas to flow to both the inner scroll 19 and the outer scroll 21. Further, in addition to switching its opening and closing, the opening can be adjusted to an intermediate-open state so as to arbitrarily adjust the intake flow rate and the intake air pressure which are supercharged.

As illustrated in FIG. 1, in the engine 1, the high-pressure fuel supplied from a fuel supply device (not shown) is injected into the combustion chamber by controlling the fuel injection timing and the injection amount from the fuel injection valve 27 by a fuel injection control device 29.

Further, the combustion gas, i.e. exhaust gas 31 combusted in the combustion chamber of the engine 1 passes through an exhaust manifold 33 formed by exhaust ports respectively provided for cylinders and through an exhaust passage 35 to drive the exhaust turbine 3 of the exhaust turbocharger 7 and become a power source for the compressor 5. Then, the exhaust gas 31 passes through the exhaust passage 35 and is discharged through an exhaust gas aftertreatment device (not shown).

An EGR passage 37 is branched from the middle of the exhaust passage 35 or exhaust manifold 33 so that a part of the exhaust gas is introduced to a downstream portion of the intake throttle valve 13 through an EGR cooler 39 and an EGR control valve 41. An, EGR unit 40 is constituted by the EGR passage 37, the EGR cooler 39 and the EGR control valve 41.

On an upstream side of the exhaust turbocharger 7, an airflow meter 43 and an atmospheric temperature sensor 45 are provided. In the intake manifold 15, an intake air temperature sensor 47, an intake air pressure sensor 49 are provided. Further, an engine speed sensor 51 and atmospheric pressure sensor 53 are provided so that signals from the sensors are incorporated into a control apparatus (ECU) 57 via a signal converter 55. Furthermore, the fuel injection amount signal is taken into the control apparatus (ECU) 57 from the fuel injection control device 29.

Moreover, from the control apparatus (ECU) 57, an EGR valve operation amount signal u1 is output to the EGR control valve 41, and a VFT valve operation amount signal u2 is output to the VFT control valve 23 of the exhaust turbocharger 7.

<Control Apparatus>

The control apparatus 57 is constituted by an integral-type optimal servo system which integrates an EGR control for controlling the opening of the EGR control valve 41 and a VFT control for controlling opening of the VFT control valve 23 of the exhaust turbocharger 7.

More specifically, the control apparatus 57 is configured to be a 2-input, 2-output integral-type optimal servo system which uses an intake air amount and an intake oxygen concentration as a controlled variable and an opening of the EGR control valve and an opening of the VFT control valve 23 of the exhaust turbocharger 7 as a manipulated variable. Further, the control apparatus 57 includes an output feedback system for feedback of the intake air amount and the intake oxygen concentration as the controlled variable from the engine 1.

This 2-input, 2-output integral-type optimal servo system is described below.

Figure 3:
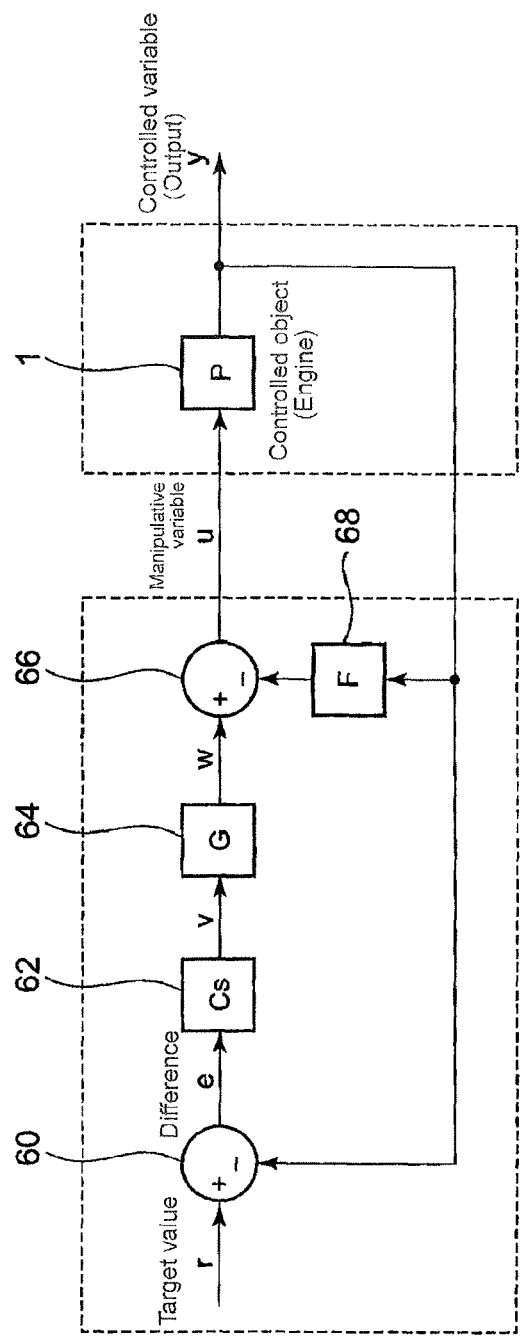
FIG. 3 is a block diagram illustrating a configuration of the control apparatus according to the first embodiment.

FIG. 3 is a block diagram illustrating a configuration of an integral servo system according to an embodiment of the present invention. The target value r of the controlled variable (the intake air amount and the intake oxygen concentration) is input, and the target value r is set in advance according to the operation state of the engine. For instance, the target value r is calculated based on map data which is described later, arithmetic expression or the like.

The adder-subtractor 60 is used to calculate the difference between the target value r and a detection value from the engine 1 which is a controlled object or the output calculated based on the detection value, (e=r−y). The difference e is integrated by an integrator 62, and the output v is input to a non-interference controller 64. Then, the output w of the non-interference controller 64 is input to an adder-subtractor 66 to calculate by the adder-subtractor 60 the difference between the output w of the non-interference controller 64 and the output Fy from an output feedback gain unit 68, (u=w−Fy). The calculated value is output to the VFT control valve 23 of the exhaust turbocharger 7 and the EGR control valve 41 as the manipulated value u.

The output feedback is formed by a first output feedback for feedback to the adder-subtractor 60 and a second output feedback for feedback to the adder-subtractor 66.

Here, the theory of the non-interference controller 64 is explained.

When the output feedback gain F (2×2 matrix) which is set by the output feedback gain unit 68, is $F=\beta(CB)^{-1}$ using a B matrix, a C matrix and an adjustable parameter $\beta$ of a state equation, Controlled object P (State variable x, ẋ), the configuration block diagram shown in FIG. 3 is expressed below and the following expressions (1) to (6) are satisfied.

$$\dot{x} = Ax + Bu \quad (1)$$

$$= Ax + B(w - Fy) \; (\because u = w - Fy) \quad (2)$$

$$= Ax - BFCx + Bw \; (\because y = Cx) \quad (3)$$

$$= (A - BFC)x + Bw \quad (4)$$

Further, from the relationship w=Gv $$w = Gv = [C(-A+BFC)^{-1}B]^{-1}v \quad (5)$$

$$G = [C(-A+BFC)^{-1}B]^{-1} \quad (6)$$

By setting a non-interference gain G of the non-interference controller 64 to satisfy the relationship expression (6), it is possible to perform non-interference.

In other words, the non-interference gain G can be set using the output feedback gain F as well as the A, B and C matrices representing the state equation of the transfer coefficient which defines the relationship between the intake air amount and the intake oxygen concentration with respect to the manipulated variable in the EGR control valve 41 and the VFT control valve 23 which are controlled objects. Thus, it is possible to simply configure the non-interference controller 64.

Figure 4A:
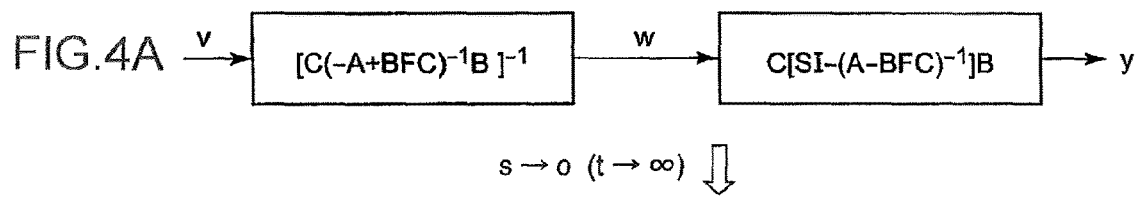
FIG. 4A is an explanatory drawing of a non-interference control.
Figure 4B:
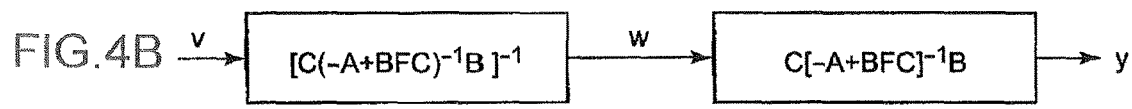
FIG. 4B is an explanatory drawing of a non-interference control.
Figure 4C:
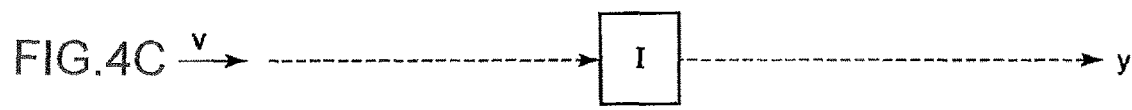
FIG. 4C is an explanatory drawing of a non-interference control.

FIG. 4 shows non-interference characteristics from v to y and schematically illustrates a transfer function between v and w which is a transfer function of the non-interference controller 64 and a transfer function between w and y which is a transfer function of the controlled object P.

The transfer function can be expressed as illustrated in FIG. 4A. It becomes S→0 (t→∞) in a stable state as illustrated in FIG. 4B, and v to y asymptotically moves to an identity matrix I. In this manner, the non-interference system can be configured.

Figure 5:
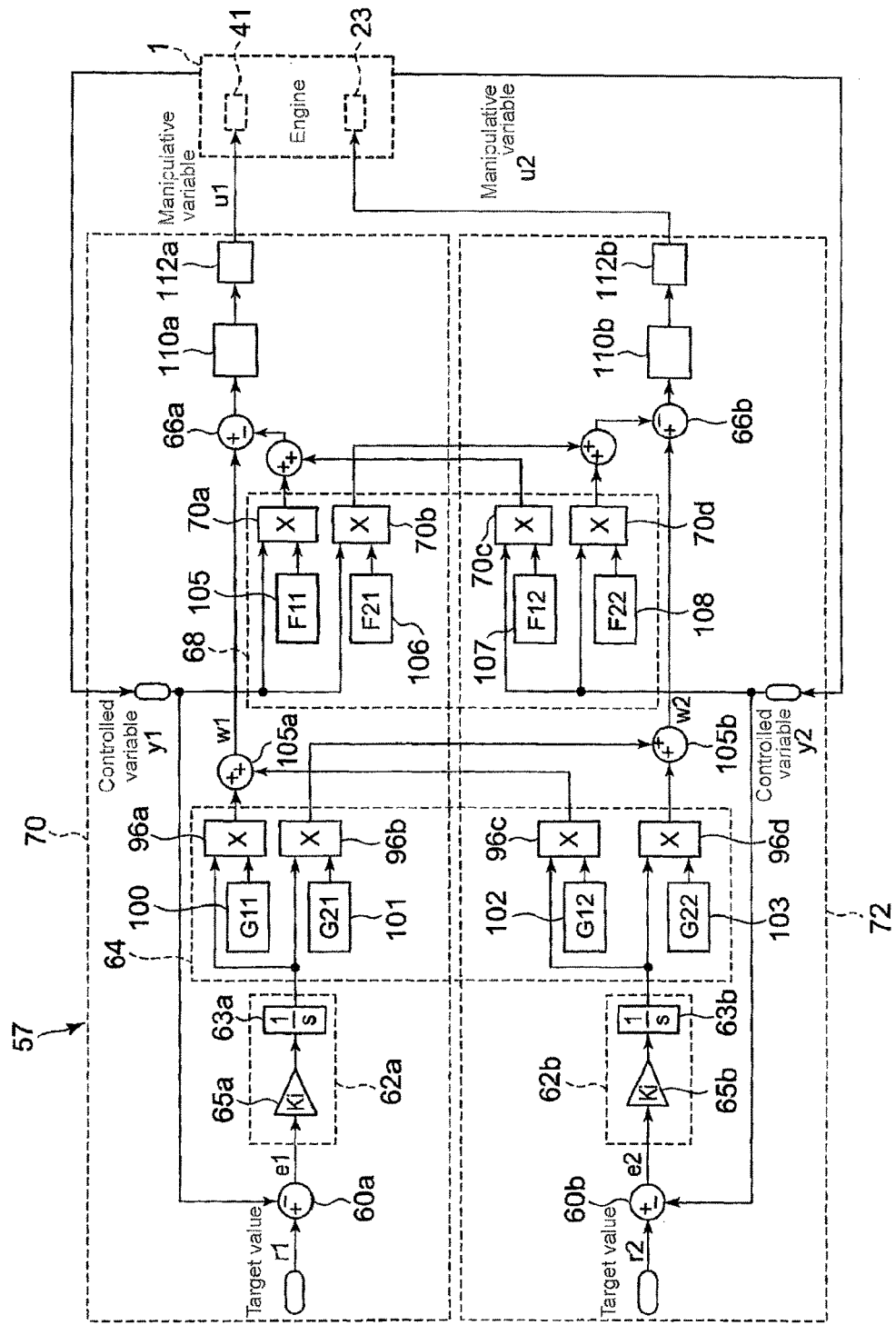
FIG. 5 is a configuration diagram of the control apparatus according to the first embodiment.

FIG. 5 shows a block diagram of the control apparatus 57. The control apparatus 57 is provided with an EGR valve opening controller 70 for controlling the opening of the EGR control valve 41 of the exhaust gas recirculation device and a VFT valve opening controller (a variable flow valve opening controller) 72 for controlling the opening of the VFT control valve 23 of the exhaust turbocharger with the variable flow rate mechanism. Each of the controllers comprises the integrator 62, the non-interference controller 64 and the output feedback gain unit 68 which have respective configurations described in reference to FIG. 3.

Figure 6A:
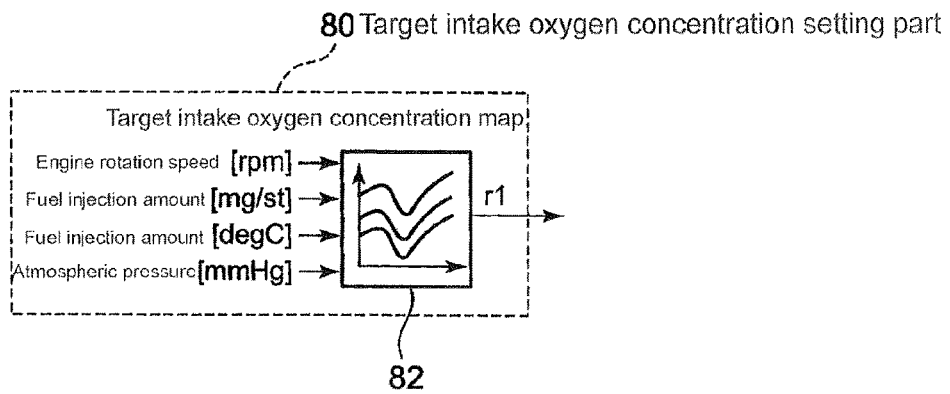
FIG. 6A is an explanatory drawing of a target intake oxygen concentration setting part.

A target intake oxygen concentration setting part 80 shown in FIG. 6A is provided. In the target intake oxygen concentrating setting part 80, the target intake oxygen concentration r1 is obtained, for instance, from a target intake oxygen concentration map 82 and using the operating state of the engine 1 as a parameter, such as the engine speed from the engine speed sensor 51, the fuel injection amount from the fuel injection control device 29, the atmospheric temperature from the atmospheric temperature sensor 45 and the atmospheric pressure from the atmospheric pressure sensor 53.

Figure 6B:
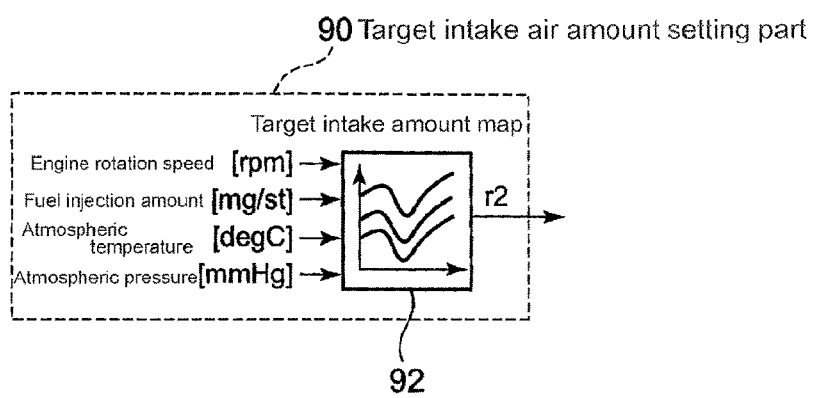
FIG. 6B is an explanatory drawing of a target intake air amount setting part.
Figure 6C:
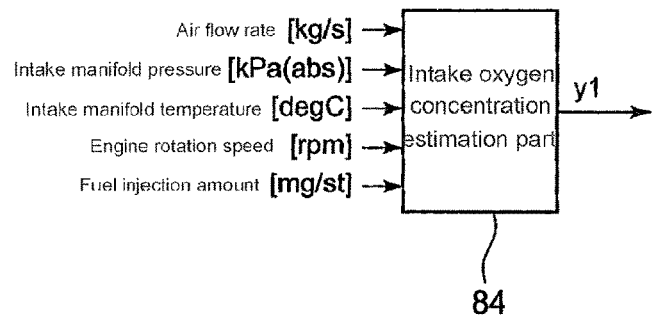
FIG. 6C is an explanatory drawing of an intake oxygen concentration estimating unit.

As the controlled variable (output) y1 of the intake oxygen concentration from the engine 1, a value estimated by an intake oxygen concentration part 84 illustrated in FIG. 6C is used.

This intake oxygen concentration estimation part 84 calculates based on respective signals of the air flow rate from the air flow meter 43 which indicates the operating state of the engine 1, the intake manifold pressure and temperature in the intake manifold 15 from the intake temperature sensor 47 and the intake air pressure sensor 49, the engine rotation speed from the engine rotation speed sensor 51 and the fuel injection amount from the fuel injection control device 29.

The actual intake oxygen concentration estimated by the intake oxygen concentration estimation part 84 and the target intake oxygen concentration set by the target intake oxygen concentration setting part 80 are input to the adder-subtractor 60*a* to calculate the difference e1 as the output from the adder-subtractor 60*a*. This calculated value of e1 is input to the integrator 62*a*.

Similarly, the target intake amount is set by the target intake air amount setting part 90 illustrated in FIG. 6B. In the target intake air amount setting part 90, the target intake air amount r2 is obtained, for instance, from a target intake air amount map 92 and using the operating state of the engine 1 as a parameter, such as the engine speed from the engine speed sensor 51, the fuel injection amount from the fuel injection control device 29, the atmospheric temperature from the atmospheric temperature sensor 45 and the atmospheric pressure from the atmospheric pressure sensor 53.

Further, the controlled variable (output) y2 of the intake air amount from the engine 1 is obtained based on the signal from the air flow meter 43. Then, the difference e2 between the actual intake air amount y2 and the target intake air amount r2 set by the target intake air amount setting part 90 is calculated as output from the adder-subtractor 60*b*. This calculated value of e2 is input to the integrator 62*b*.

Next, the difference e1 calculated by the adder-subtractor 60*a* of the EGR valve opening controller 70 is input to the integrator 62*a* to perform integral calculation. The output of this integral calculation is then input to the non-interference controller 64 where the output of the integral calculation and the non-interference gain G which is set in advance by the relationship of the expression (6) are multiplied by a multiplier 96*a*.

The non-interference gain G is decomposed and set as a parameter indicating the operating state of the engine for each component (G11, G21, G12, G22), for instance the engine rotation speed Ne and the fuel injection amount Qf set as parameters. These parameters are stored in a storage part of the control apparatus 57 as the non-interference gain maps 100, 101, 102, 103. Although not shown in FIG. 5, the signals of the engine rotation speed Ne and the fuel injection amount Qf are input to each of the non-interference gain maps 100, 101, 102, 103.

In the non-interference gain map 100, the component G11 of the non-interference gain is set and a gain value that defines the relationship between the opening degree of the EGR control valve 41 and the intake oxygen concentration is set. Further, in the non-interference gain map 101, the component G12 of the non-interference gain is set and a gain value which defines the non-interference relationship between the opening degree of the VFT control valve 23 and the intake oxygen concentration is stored.

Similarly, in the non-interference gain map 103, the component G22 of the non-interference gain is set and a gain value that defines the relationship between the intake air amount and the opening degree of the VFT control valve 23 is set. Further, in the non-interference gain map 102, the component G12 of the non-interference gain is set and a gain value that defines the non-interference relationship between the intake air amount and the opening degree of the VFT control valve 41 is set.

The component G11 of the non-interference gain of the EGR valve opening controller 70 is multiplied with the output signal of the integrator 62*a* by the multiplier 96*a* and then input to an adder 105*a*. Further, the component G12 of the non-interference gain of the VFT valve opening controller 72 is multiplied with the output signal of the integrator 62*b* by the multiplier 96*c* and then input to the adder 105*a*. Finally, these signals are added together and output as the output signal w1.

Similarly, in the VFT valve opening controller, the component G22 of the non-interference gain is multiplied by the multiplier 96*d* with the output signal of the integrator 62*b* and then input to an adder 105*b*. Further, the component G21 of the non-interference gain of the EGR valve opening controller 70 is multiplied with the output signal of the integrator 62*a* by the multiplier 96*b* and then input to the adder 105*b*. Finally, these signals are added together and output as the output signal w2.

The output signal w1 of the EGR valve opening controller 70 is then input to the adder-subtractor 66*a* to be added/ subtracted with the output signal from the output feedback gain unit 68 by the adder-subtractor 66a.

The output feedback gain unit 68 is configured to multiply by multipliers 70a to 70d the output feedback gain F with the intake oxygen concentration and the intake air amount having been feedbacked.

By decomposing a 2×2 matrix, the output feedback gain F is set as a parameter indicating the operating state of the engine for each component (F11, F21, F12, F22), for instance the engine rotation speed Ne and the fuel injection amount Qf being set as parameters. These parameters are stored in a storage part of the control apparatus 57 as the output feedback gain maps 105, 106, 107, 108. Although not shown in FIG. 5, the signals of the engine rotation speed Ne and the fuel injection amount Qf are input to each of the output feedback gain maps 105, 106, 107, 108.

This output feedback gain F is set so that the gain value which can satisfy the non-interference relationship by the above expression (6) is set.

In the output feedback gain map 105, the component F11 of the output feedback gain is set and a gain value that defines the relationship between the intake oxygen concentration and the opening degree of the EGR control valve 41 is set. Further, in the output feedback gain map 106, the component F21 of the output feedback gain is set and a gain value for determining the non-interference relationship between the intake oxygen concentration and the opening degree of the VFT control valve 23 is stored.

Similarly, in the output feedback gain map 108, the component F22 of the output feedback gain is set and a gain value that defines the relationship between the intake air quantity and the opening degree of the VFT control valve 23 is set. Further, in the output feedback gain map 107, the component F12 of the output feedback gain is set and a gain value for determining the non-interference relationship between the intake air quantity and the opening degree of the EGR control valve 41 is stored.

The output signal w1 from the non-interference controller 64 of the EGR valve opening controller 70 is input to the adder-subtractor 66a, is subtracted with the output signal from the output feedback gain unit 68, then a nonlinear signal is converted to a linear output signal in a non-linearity correction part 110a, and finally the linear output signal is processed by limiter processing in a limiter part 112a and is output as an output signal u1 of the opening degree operation amount of the EGR control valve 41.

Similarly, in the VFT valve opening controller 72, the output signals w2 from the non-interference controller 64 is input to the adder-subtractor 66b, is subtracted with the output signal from the output feedback gain unit 68, then, a nonlinear signal is converted to a linear output signal in a non-linear correction part 110b, and finally the linear output signal is processed by limiter processing in a limiter part 112b and is output as an output signal u2 of the opening degree operation amount of the VFT control valve 23.

Figure 8:
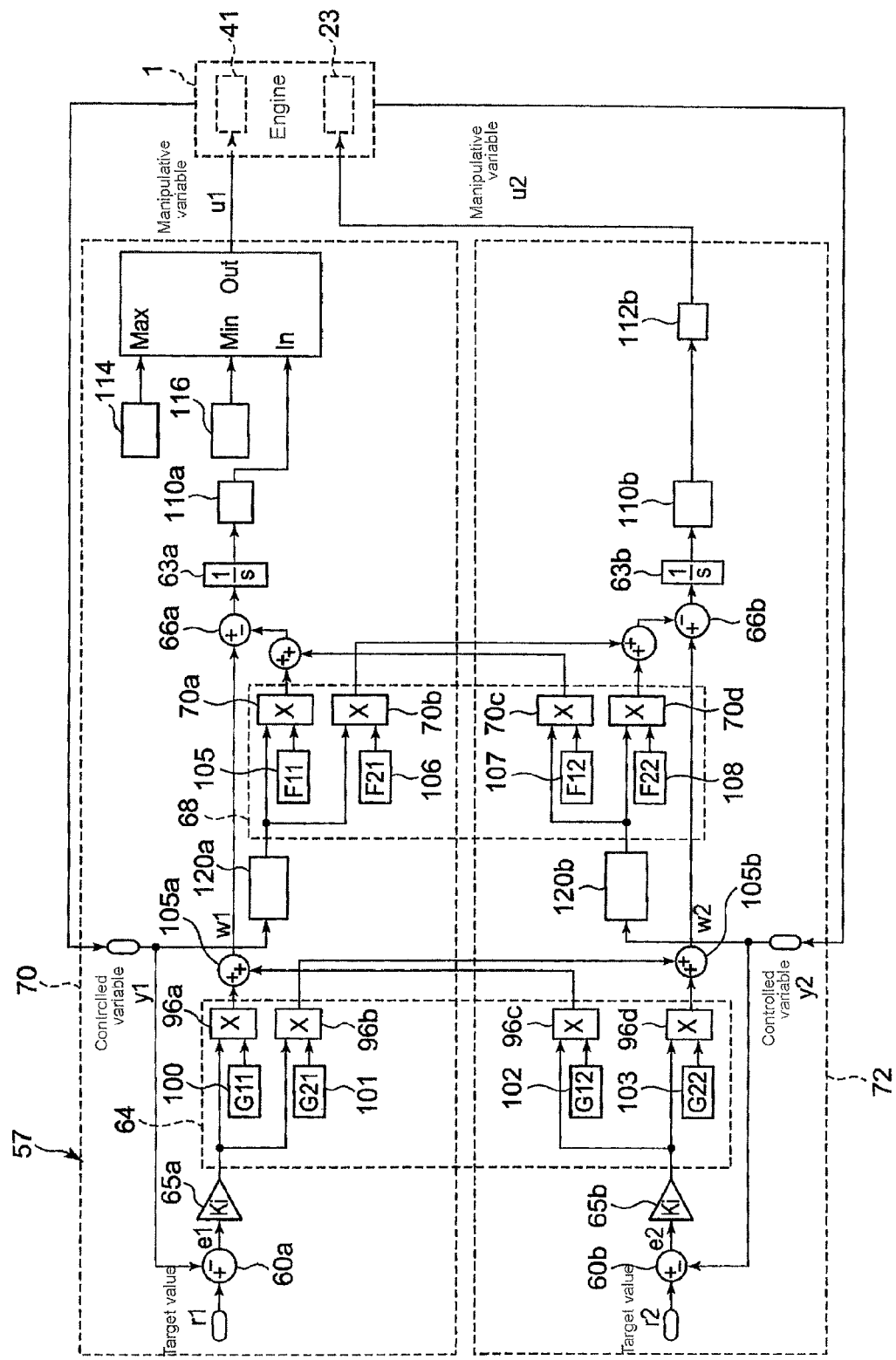
FIG. 8 is a configuration diagram of the control apparatus according to the second embodiment.

The limiter parts 112a and 112b are provided to regulate the manipulated variable of the EGR control valve 41. However, this is not limitative and, in place of the limiter parts, the maximum and minimum opening degrees of the EGR control valve 41 may be set based on a EGR valve minimum opening map 114 and a EGR valve maximum opening map 116 that are set optimally according to an operating state of the engine (the engine rotation speed Ne and the fuel injection amount Qf) as illustrated in FIG. 8.

This is because, once the EGR valve is fully opened, the intake air amount tends to remain the same even by changing the opening degree of the VFT control valve 23. Thus, the opening is limited, by providing the maximum opening map, such that the maximum opening degree is the degree that is not affected by change of the VFT control valve 23. Further, the minimum opening degree is set so that exhaust gas purification performance can be confirmed at the minimum opening degree, to ensure the exhaust gas purification performance.

According to the control apparatus 57 configured as described above, the control apparatus 57 is configured to be a 2-input, 2-output integral-type optimal servo system which uses the intake air amount and the intake oxygen concentration as the controlled variable and the opening degree of the EGR control valve 41 and the opening degree of the VFT control valve 23 of the exhaust turbocharger 7 with the variable flow rate mechanism, and the control apparatus 57 includes an output feedback system for feedback of the detected intake air amount from the engine 1 and the intake oxygen concentration calculated based on the operating state of the engine 1. Therefore, compared to two independent control apparatuses for independently controlling the EGR control valve 41 of the exhaust gas recirculation device and the VFT control valve 23 of the exhaust turbocharger 7, it is possible to perform cooperative control.

Further, the control apparatus 57 comprises the EGR valve opening controller 70 for controlling the opening of the EGR control valve 41 of the exhaust gas recirculation device and the VFT opening controller 72 for controlling the opening of the VFT control valve 23 of the exhaust turbocharger 7 with the variable flow rate mechanism. Furthermore, the non-interference controller 64 is provided for non-interference between the controlled variable controlled by the manipulated variable of the EGR control valve 41 and the controlled variable controlled by the manipulated variable of the VFT control valve 23. By the non-interference controller 64, it is possible to control so that the controlled variable controlled by the manipulated variable of the EGR control valve 41 does not interfere with the controlled variable controlled by the manipulated variable of the VFT control valve 23.

Further, the non-interference gain G of this non-interference controller 64 can be set using the output feedback gain F as well as the A, B and C matrices representing the state equation of the transfer coefficient which defines the relationship between the intake air amount and the intake oxygen concentration with respect to the manipulated variable in the EGR control valve 41 and the VFT control valve 23 which are controlled objects. Thus, it is possible to simply configure the non-interference controller 64.

(Second Embodiment)

Next, referring to FIG. 7 and FIG. 8, a second embodiment is described. The second embodiment differs from the first embodiment in that the integral calculation section 63 of the integrator 62 is placed after addition and subtraction of the output signal from the non-interference controller 64 and the output feedback gain unit 68.

Figure 7A:
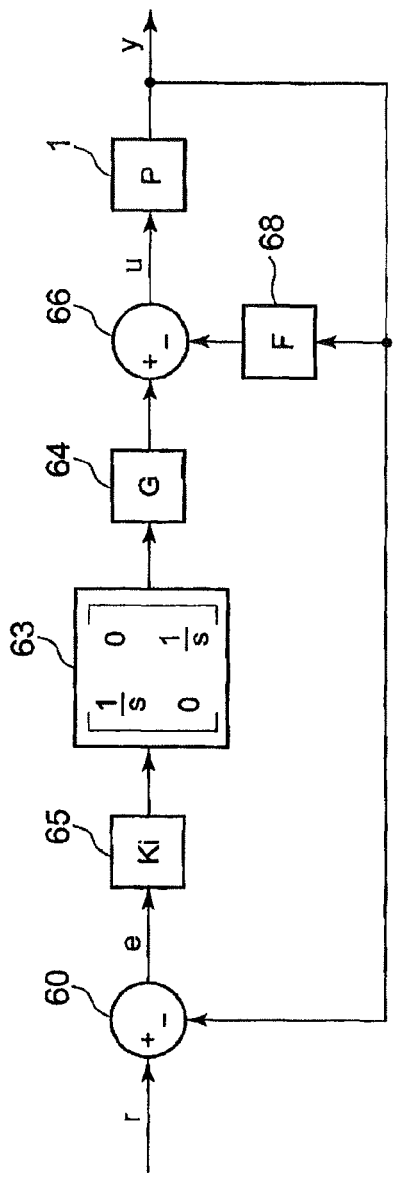
FIG. 7A is a block diagram of a configuration of the control apparatus according to the first embodiment.
Figure 7B:
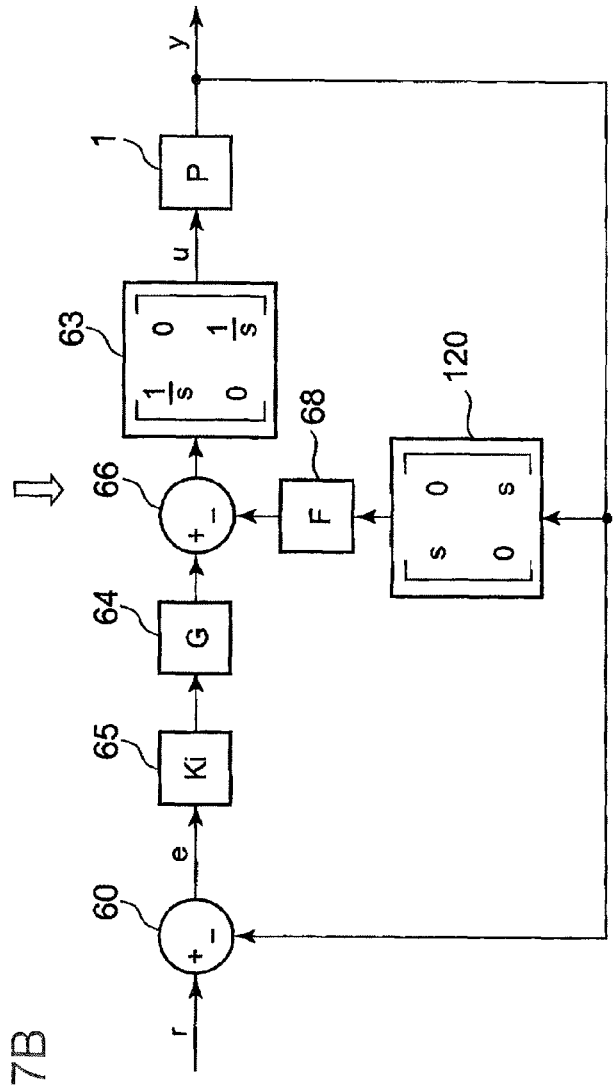
FIG. 7B is a block diagram of a configuration of the control apparatus according to a second embodiment.

FIG. 7A is a block diagram of the configuration according to the first embodiment in which the integral gain is set in an integral gain section 65 and then calculated in the integral calculation section 63. In contrast, in the second embodiment illustrated in FIG. 7B, the integral calculation section 63 is placed after the adder-subtractor 66.

Therefore, differential processing of the output feedback gain signal is required. Thus, a differential processing section 120 is arranged before the output feedback gain unit 68.

A specific configuration diagram is illustrated in FIG. 8. In the EGR valve opening controller 70, the integral calculation section 63a of the integrator 62a is provided behind the adder-subtractor 66a. Further, a differential processing unit 120a is provided at the input to the output feedback gain unit 68.

In the VFT valve opening control unit 72 as well, the integral calculation section 63b of the integrator 62b is provided behind the adder-subtractor 66b. Further, a differential processing unit 120b is provided at the input to the output feedback gain unit 68.

The rest of the configuration is substantially the same as that of the first embodiment illustrated in FIG. 5 and thus components already described with reference to FIG. 5 are denoted by the same reference numerals, and thus detailed description thereof will be hereinafter omitted.

In this manner, the integral calculation section 63a, 63 of the integrator 62a, 62b is placed after the non-interference gain G is set by the non-interference controller 64, the output feedback gain F is set by the output feedback gain unit 68 and then the output signal obtained by multiplying these gains is added/subtracted by the adder-subtractor 66a, 66b, so as to perform stable non-interference.

More specifically, the non-interference gain G is set by the non-interference controller 64 based on the non-interference maps 100, 101, 102, 103 whose parameters include the engine rotation speed or the fuel injection amount and thus, small change in the engine rotation speed or the fuel injection amount in the steady operation can cause fluctuation of the non-interference gain and this may cause oscillation of the outputted manipulated variable. In the present embodiment, the non-interference gain is integrated by the integral calculation section 63a, 63b and then is output as the manipulated variable to perform the stable non-interference processing. More specifically, even by precisely setting the non-interference gain G and the output feedback gain F based on the map data using the engine rotation speed and the fuel injection amount as parameters, it is possible to achieve the steady non-interference effect with no oscillation of the manipulated variable.

(Third Embodiment)

Figure 9:
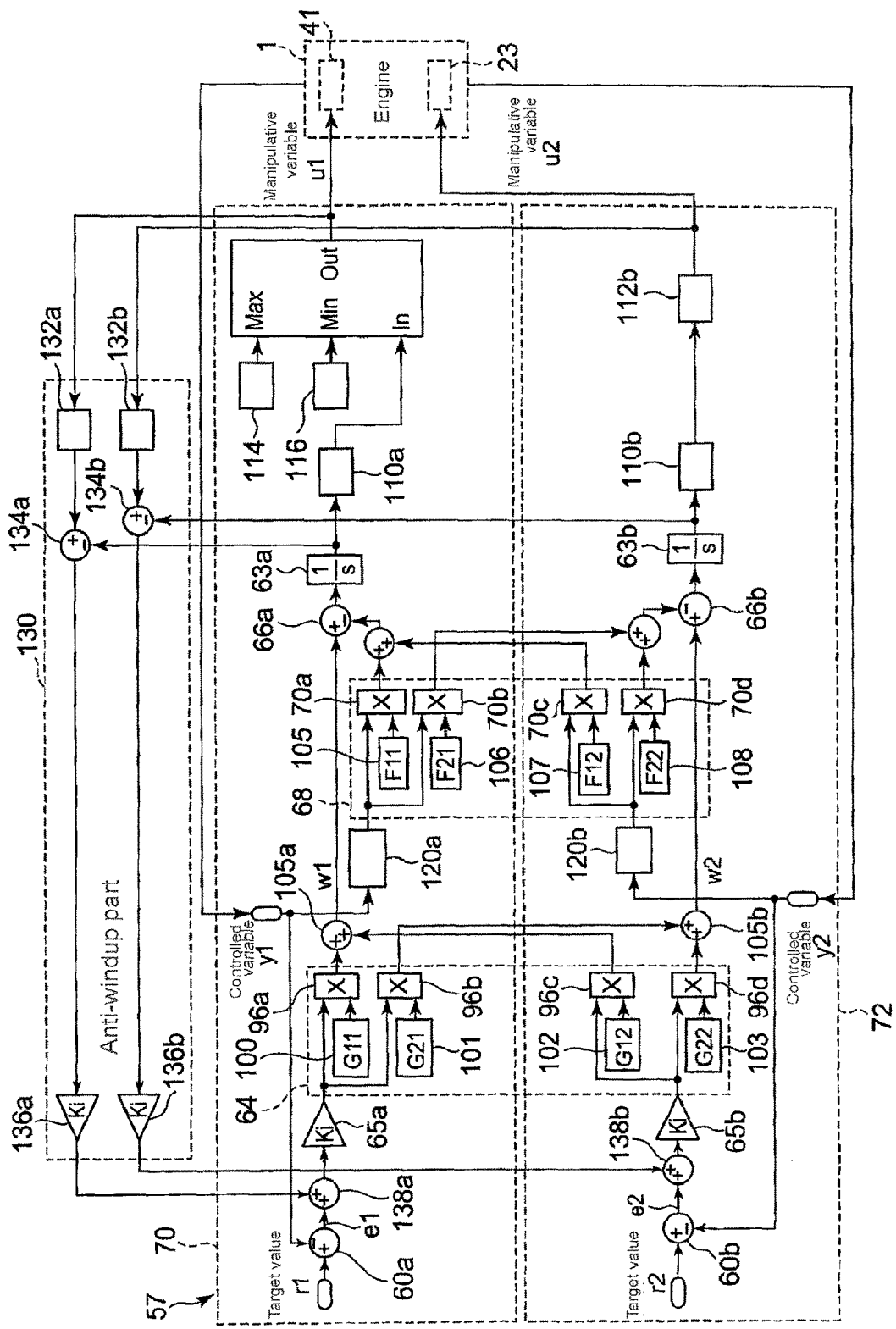
FIG. 9 is a configuration diagram of the control apparatus according to a third embodiment.

Next, a third embodiment is described in reference to FIG. 9. The third embodiment differs from the second embodiment in that an anti-windup part 130 is provided.

This anti-windup part 130 is configured, as illustrated in FIG. 9 so that the output signal u1 of the manipulated variable of the opening degree of the EGR control valve 41 and the output signal u2 of the manipulated variable of the opening degree of the VFT control valve 23 are input to non-linear sections 132a and 132b, respectively, and added/subtracted in the adder-subtractors 134a and 134b with the output of the integral calculation sections 63a and 63b and multiplied by gain in gain sections 136a and 136b and then returned to the input side to be added to the differences e1 and e2 in adders 138a and 138b.

After the output signals u1 and u2 of the manipulated variable are limited by the limiter, if the target value of the controlled variable changes, windup (saturation of the integrator) occurs in the case where the anti-windup part is not provided, and this reduces the controlled variable responsiveness. In the present embodiment, by providing the anti-windup part 130, windup occurrence is prevented and the controlled variable responsiveness is improved to improve reduction in NOx emission and black smoke emission in a transient state.

In the above embodiments, the VFT ((variable flow turbo) equipped with the VFT control valve 23 as illustrated in FIG. 2 is described as the exhaust turbocharger 7 equipped with the variable flow rate mechanism. However, this configuration is not restrictive and it may be a VGT (variable geometry turbo) configuration which is configured to vary an exhaust gas amount fed to a turbine wheel by changing the opening degree of the vanes provided around the turbine wheel, or may be any configuration as long as the supercharging flow rate is variable.

Further, the intake air amount is calculated based on the detection value from the air flow meter 43. However, this is not restrictive, and the intake air amount may be calculated based on a single regarding the operation condition of the engine 1.

[Industrial Applicability]

According to the present invention, in the internal combustion engine provided with EGR and the variable flow mechanism with supercharger, the control apparatus for controlling the turbocharger provided with the EGR and the variable flow rate mechanism is composed of a 2-input, 2-output integral-type optimal servo system, and it is possible to avoid mutual interference of the control of the EGR and the control of the turbocharger with variable flow rate mechanism with each other, reduce emissions of smoke and NOx efficiently and stably. Thus, it is suitable for use in the control apparatus for the internal combustion engine and the control method.

The invention claimed is:

1. A control apparatus for an internal combustion engine which comprises an exhaust gas recirculation device and a supercharger equipped with a variable flow rate mechanism,
wherein the control apparatus is configured to be a 2-input, 2-output integral-type optimal servo system which uses an intake air amount and an intake oxygen concentration as a controlled variable and an opening of a control valve of the exhaust gas recirculation device and an opening of a control valve of the supercharger with the variable flow rate mechanism as a manipulated variable, the control apparatus including an output feedback system for feedback of the controlled variable from the internal combustion engine,
wherein the control apparatus comprises:
an EGR valve opening controller for controlling the opening of the control valve of the exhaust gas recirculation device; and
a variable flow valve opening controller for controlling the opening of the control valve of the supercharger with the variable flow rate mechanism,
wherein each of the EGR valve opening controller and the variable flow valve opening controller comprises a non-interference controller for non-interference between the controlled variable controlled by the manipulated variable of the control valve of the exhaust gas recirculation device and the controlled variable controlled by the manipulated variable of the control valve of the supercharger with the variable flow rate mechanism with respect to each other,
wherein the non-interference controller is configured to multiply a difference value between an output feedback signal of the controlled variable from the internal combustion engine and a target value of the controlled variable, or a calculated value based on the difference value by a non-interference gain,
wherein the non-interference gain includes a plurality of components, and wherein each component of the non-interference gain includes:
a gain value configured to define a non-interference relationship between the intake oxygen concentration and an opening degree of the control valve of the exhaust gas recirculation device;

a gain value configured to define a non-interference relationship between the intake oxygen concentration and an opening degree of the control valve of the supercharger with the variable flow rate mechanism;

a gain value configured to define a non-interference relationship between the intake air amount and the opening degree of the control valve of the exhaust gas recirculation device; and a gain value configured to define a non-interference relationship between the intake air amount and the opening degree of the control valve of the supercharger with the variable flow rate mechanism.

2. The control apparatus according to claim 1, wherein the output feedback signal of the controlled variable from the internal combustion engine includes a first output feedback signal returning to an input side of each of the controllers and a second output feedback signal returning to an output side of said each of the controllers, and wherein a non-interference gain of the non-interference controller is set based on an output feedback gain of the second output feedback signal.

3. The control apparatus according to claim 2,
wherein each of the EGR valve opening controller and the variable flow valve opening controller comprises:

a difference calculator for calculating a difference between a target value of the controlled variable and the first output feedback signal in said each of the EGR valve opening controller and the variable flow valve opening controller;

an integrator for integrating the difference calculated by the difference calculator; and the non-interference controller to which an integrated value calculated by the integrator is input.

4. The control apparatus according to claim 3,
wherein each of the EGR valve opening controller and the variable flow valve opening controller comprises:

a limiter for limiting the manipulated variable within a certain range; and an anti-windup part.

5. The control apparatus according to claim 2,
wherein each of the EGR valve opening controller and the variable flow valve opening controller comprises:

a difference calculator for calculating a difference between a target value of the controlled variable and the first output feedback signal in said each of the EGR valve opening controller and the variable flow valve opening controller;

the non-interference controller to which a difference value calculated by the difference calculator is input; and an integrator for integrating an output value from the non-interference controller.

6. The control apparatus according to claim 5,
wherein each of the EGR valve opening controller and the variable flow valve opening controller comprises:

a limiter for limiting the manipulated variable within a certain range; and an anti-windup part.

7. The control apparatus according to claim 2,
wherein the non-interference gain of the non-interference controller is set as map data which corresponds to a rotation speed and a fuel injection amount of the internal combustion engine.

8. The control apparatus according to claim 2,
wherein each of the EGR valve opening controller and the variable flow valve opening controller comprises:

a limiter for limiting the manipulated variable within a certain range; and an anti-windup part.

9. The control apparatus according to claim 1,
wherein each of the EGR valve opening controller and the variable flow valve opening controller comprises:

a limiter for limiting the manipulated variable within a certain range; and an anti-windup part.

10. A control method for an internal combustion engine which comprises an exhaust gas recirculation device and a supercharger equipped with a variable flow rate mechanism, the control method comprising the steps of:

controlling by a 2-input, 2-output integral-type optimal servo system which uses an intake air amount and an intake oxygen concentration as a controlled variable and an opening of a control valve of the exhaust gas recirculation device and an opening of a control valve of the supercharger with the variable flow rate mechanism as a manipulated variable, and controlling by an output feedback system for feedback of the controlled variable from the internal combustion engine;

calculating a non-interference gain of a non-interference controller based on an output feedback gain of an output feedback signal, the non-interference controlling being configured not to interfere with the controlled variable controlled by the manipulated variable of the control valve of the exhaust gas recirculation device and the controlled variable controlled by the manipulated variable of the control valve of the supercharger with the variable flow rate mechanism with respect to each other;

calculating the non-interference gain based on map data in which each component of the non-interference gain is stored, the each component of the non-interference gain including: a gain value configured to define a non-interference relationship between the intake oxygen concentration and an opening degree of the control valve of the exhaust gas recirculation device; a gain value configured to define a non-interference relationship between the intake oxygen concentration and an opening degree of the control valve of the supercharger with the variable flow rate mechanism; a gain value configured to define a non-interference relationship between the intake air amount and the opening degree of the control valve of the exhaust gas recirculation device; and a gain value configured to define a non-interference relationship between the intake air amount and the opening degree of the control valve of the supercharger with the variable flow rate mechanism; and calculating the manipulated variable of the control valve of the exhaust gas recirculation device and the manipulated variable of the control valve of the supercharger with the variable flow rate mechanism based on an output value being set to the calculated non-interference gain.

* * * * *